US008963062B2

(12) United States Patent
Sasaki et al.

(10) Patent No.: US 8,963,062 B2
(45) Date of Patent: Feb. 24, 2015

(54) PHOTO DETECTION DEVICE

(75) Inventors: Satoru Sasaki, Iida (JP); Masaki Fujii, Iida (JP); Hiroki Kitajima, Iida (JP); Tomohiro Sawayanagi, Iida (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 979 days.

(21) Appl. No.: 13/091,734

(22) Filed: Apr. 21, 2011

(65) Prior Publication Data
US 2011/0260034 A1 Oct. 27, 2011

(30) Foreign Application Priority Data
Apr. 21, 2010 (JP) ................................. 2010-097714

(51) Int. Cl.
G01J 1/20 (2006.01)
G01J 1/04 (2006.01)
B60H 1/00 (2006.01)
G01J 1/02 (2006.01)
G01J 1/42 (2006.01)

(52) U.S. Cl.
CPC ............. *G01J 1/0411* (2013.01); *B60H 1/0075* (2013.01); *G01J 1/0204* (2013.01); *G01J 1/0271* (2013.01); *G01J 1/029* (2013.01); *G01J 1/4228* (2013.01); *G01J 2001/4266* (2013.01)
USPC ...................................... 250/203.4; 250/239

(58) Field of Classification Search
USPC .......... 250/203.4, 239; 126/572, 573; 315/82; 356/139.01
See application file for complete search history.

(56) References Cited

U.S. PATENT DOCUMENTS

| 5,821,994 A | 10/1998 | Tani |
| 6,521,882 B1 | 2/2003 | Sumiya et al. |
| 6,888,120 B2 * | 5/2005 | Chiasson et al. ............ 250/203.4 |
| 7,157,678 B2 * | 1/2007 | Maldziunas et al. ........ 250/203.4 |
| 7,235,765 B2 * | 6/2007 | Clugston, Jr. ............... 250/203.4 |
| 7,378,628 B2 * | 5/2008 | Maldziunas ................ 250/203.4 |
| 2005/0161581 A1 | 7/2005 | Michiyama et al. |

(Continued)

FOREIGN PATENT DOCUMENTS

| CN | 2709226 Y | 7/2005 |
| CN | 101446541 A | 6/2009 |

(Continued)

OTHER PUBLICATIONS

Japanese Office Action issued in Japanese Patent Application No. 2010-097714, mailing date Oct. 8, 2013, with English translation thereof (8 pages).

(Continued)

*Primary Examiner* — Seung C Sohn
(74) *Attorney, Agent, or Firm* — Osha Liang LLP

(57) ABSTRACT

A photo detection device, which is disposed in a vehicle, includes a first photo detection element that detects light and a first signal processing unit that performs a predetermined process based on a detection result of the first photo detection element. The photo detection device also includes a first board on which the first photo detection element is mounted and a second board on which the first signal processing unit is mounted. Additionally, the photo detection device includes a holding member that holds the first board and the second board and a housing that accommodates the holding member. The holding member holds the first board and the second board such that the second board is arranged in a second plane different from a first plane in which the first board is arranged.

13 Claims, 12 Drawing Sheets

(56) References Cited

U.S. PATENT DOCUMENTS

2008/0087079 A1    4/2008    Jeitner et al.
2010/0012824 A1    1/2010    Backes

FOREIGN PATENT DOCUMENTS

| | | |
|---|---|---|
| CN | 201281628 Y | 7/2009 |
| EP | 0492352 A2 | 7/1992 |
| JP | 4-48504 Y2 | 11/1992 |
| JP | H08261819 A | 10/1996 |
| JP | 2000258244 A | 9/2000 |
| JP | 2001068692 A | 3/2001 |
| JP | 2003-337178 A | 11/2003 |
| JP | 3504407 B2 | 3/2004 |
| JP | 2005-238921 A | 9/2005 |
| JP | 3783451 B2 | 6/2006 |
| JP | 2010-025924 A | 2/2010 |

OTHER PUBLICATIONS

European Search Report issued in European Application No. 11163202.2 mailed May 21, 2013 (8 pages).
Patent Abstracts of Japan, Publication No. JP2001068692 dated Mar. 16, 2001 (1 page).
Patent Abstracts of Japan, Publication No. JP2000258244 dated Sep. 22, 2000 (1 page).
Office Action in corresponding Chinese application No. 201110099483.1 dated Apr. 17, 2013 (13 pages).
Espacenet Abstract, Publication No. CN201281628 dated Jul. 29, 2009 (1 page).
Office Action in corresponding Chinese Patent Application No. 201110099483.1 dated Dec. 9, 2013, with translation (16 pages).
Espacenet Publication Abstract for CN101446541, publication date Jun. 3, 2009 (1 page).
Espacenet Publication Abstract for CN2709226, publication date Jul. 13, 2005 (1 page).

* cited by examiner

PHOTO DETECTION DEVICE

BACKGROUND OF THE INVENTION

1. Technical Field

One or more embodiments of the present invention relate to a photo detection device arranged in a vehicle.

2. Related Art

Conventionally, there is known a photo detection device arranged in a vehicle for automatically controlling an air conditioner of the vehicle. The photo detection device includes an insolation sensor for detecting an insolation amount that enters inside the vehicle from outside the vehicle. In a vehicle arranged with the photo detection device, an amount of heat to which a passenger of the vehicle is exposed is determined based on a detection result of the insolation sensor, and the air conditioner is controlled according to the determined amount of heat.

Conventionally, there is also known a photo detection device arranged in a vehicle for automatically controlling lights of the vehicle (see e.g., Japanese Patent No. 3504407). Such a photo detection device includes an illuminance sensor for detecting illuminance at a periphery of the vehicle. In the vehicle arranged with the photo detection device, the lights are controlled according to the detection result of the illuminance sensor.

The photo detection device described in Japanese Patent No. 3504407 includes a board to which the illuminance sensor is attached, and a case for accommodating the board. The board includes an integrated circuit and also includes a connector unit to which a lead wire is connected. The board is accommodated along a guide rail formed on the inner wall of the case.

However, the photo detection device disclosed in Japanese Patent No. 3504407 is difficult to miniaturize because the illuminance sensor and the integrated circuit are arranged on one board.

SUMMARY OF INVENTION

One or more embodiments of the present invention has been devised to provide a photo detection device that can facilitate assembly while realizing miniaturization.

In accordance with one aspect of one or more embodiments of the present invention, a photo detection device of one or more embodiments of the present invention relates to a photo detection device arranged in a vehicle, the device including: a first photo detection element for detecting light; a first signal processing unit for performing a predetermined process based on a detection result of the first photo detection element; a first board on which the first photo detection element is mounted; a second board on which the first signal processing unit is mounted; a holding member for holding the first board and the second board; and a housing for accommodating the holding member, wherein the holding member holds the first board and the second board so that the second board is arranged in a plane different from a plane in which the first board is arranged.

Because the first board on which the first photo detection element is mounted and the second board on which the first signal processing unit is mounted are separately arranged, and the second board is arranged in a plane different from a plane in which the first board is arranged, the first board and the second board are stereoscopically arranged, the photo detection device can be miniaturized as compared to the case in which the first photo detection element and the first signal processing unit are mounted on one board. Furthermore, by arranging the holding member for holding the first board and the second board, the holding member can be accommodated in the housing after attaching the first board and the second board to the holding member. Therefore, the accommodation to the housing is facilitated. As a result, the assembly can be facilitated while realizing miniaturization.

In the above photo detection device, the holding member may hold the first board and the second board so that the plane in which the first board is arranged and the plane in which the second board is arranged are orthogonal.

In the above photo detection device, the holding member may be formed with an engagement part that engages with the housing.

The above photo detection device may further include a connector unit held by the holding member, wherein the holding member holds the first board at an upper side of the connector unit and holds the second board at a side of the connector unit.

The above photo detection device may further include a communication circuit, mounted on the second board, for outputting a processing signal from the first signal processing unit with a digital signal.

The above photo detection device may further include a second photo detection element for detecting light, wherein the second photo detection element may be mounted on the first board.

In this case, the photo detection device may further include a second signal processing unit for performing a predetermined process based on a detection result of the second photo detection element.

In the photo detection device including the second signal processing unit, the second signal processing unit may be mounted on the second board.

The photo detection device including the second signal processing unit, may further include a third board on which the second signal processing unit is mounted, wherein the holding member holds the third board so that the third board is arranged in a plane different from a plane in which the first board is arranged.

According to one or more embodiments of the present invention, the photo detection device that can facilitate the assembly while realizing miniaturization can be provided.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

First, a configuration of a photo detection device 100 and a vehicle 150 according to one or more embodiments of the present invention will be described with reference to FIG. 1.

Figure 1:
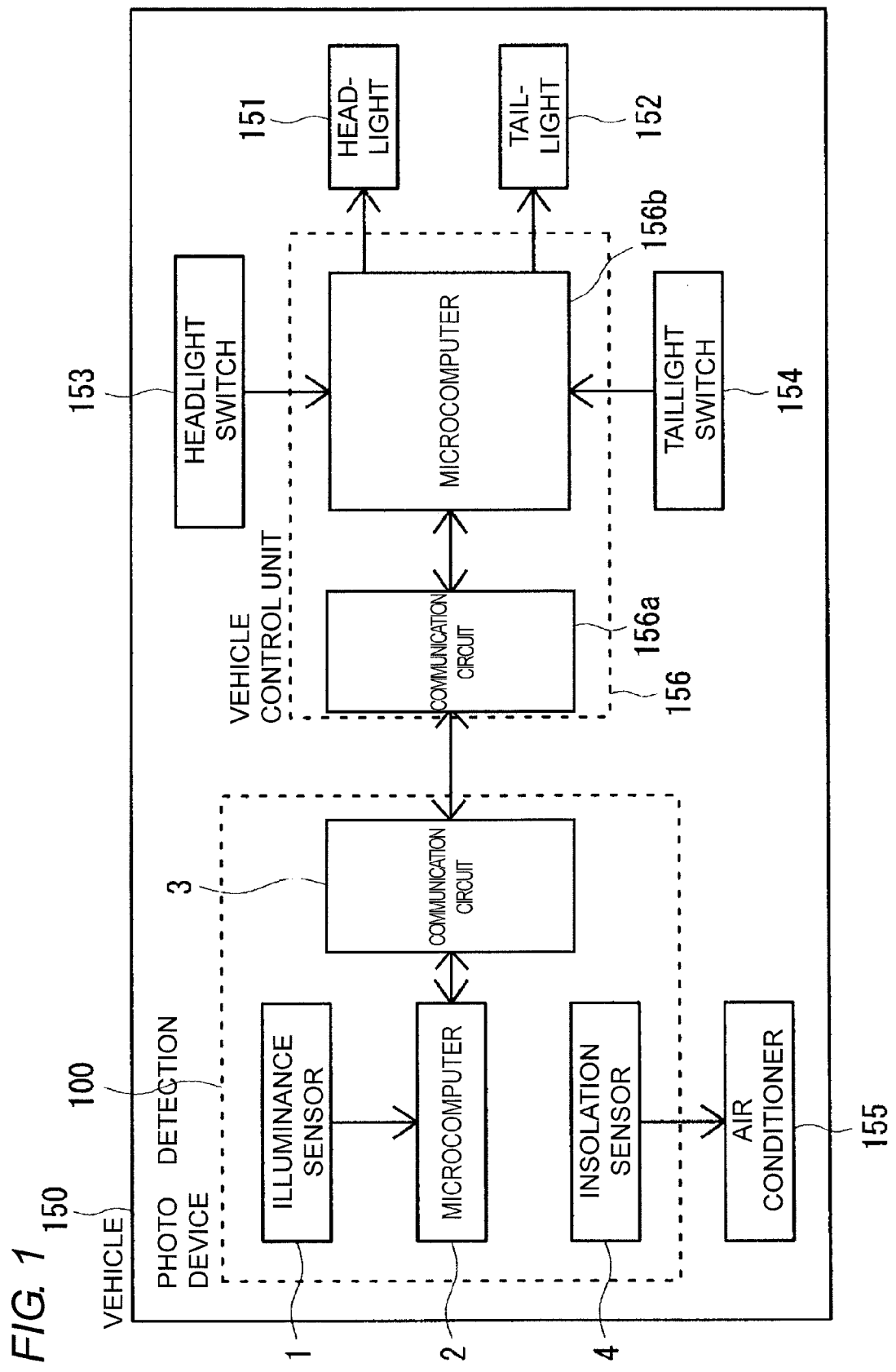
FIG. 1 is a block diagram showing a configuration of a photo detection device and a vehicle according to one or more embodiments of the present invention.

As shown in FIG. 1, the vehicle 150 includes a headlight 151, a taillight 152, a headlight switch 153, a taillight switch 154, a photo detection device 100, an air conditioner 155, and a vehicle control unit 156.

The vehicle 150 is an automatic four wheel vehicle or the like. The headlight 151 is arranged at the front end of the vehicle 150. The headlight 151 is arranged to illuminate so that a driver (passenger) can visually see the front side of the vehicle 150. The taillight 152 is arranged at the back end of the vehicle 150. The taillight 152 is arranged to notify the existence of the own vehicle to the following vehicles.

The headlight switch 153 outputs a light-ON command or a light-OFF command of the headlight 151 to the vehicle control unit 156 by being operated by the driver. In other words, the headlight switch 153 is a manual switch for controlling the light-ON/OFF state of the headlight 151.

The taillight switch 154 outputs a light-ON command or a light-OFF command of the taillight 152 to the vehicle control unit 156 by being operated by the driver. In other words, the taillight switch 154 is a manual switch for controlling the light-ON/OFF state of the taillight 152.

The photo detection device 100 includes an illuminance sensor 1, a microcomputer 2, a communication circuit 3, and an insolation sensor 4. The structure of the photo detection device 100 will be described in detail later. The illuminance sensor 1 serves as a "first photo detection element" of one or more embodiments of the present invention and the microcomputer 2 serves as a "first signal processing unit" of one or more embodiments of the present invention. The insolation sensor 4 serves as a "second photo detection element" of one or more embodiments of the present invention.

The illuminance sensor 1 detects the illuminance of the periphery of the vehicle 150. The microcomputer 2 is configured by a CPU, a ROM, a RAM, and the like, and outputs a control signal (light-ON command or light-OFF command) for controlling the headlight 151 and the taillight 152 to the vehicle control unit 156 based on a detection result of the illuminance sensor 1.

Specifically, the microcomputer 2 determines that the periphery of the vehicle 150 is dark and outputs the light-ON command of the headlight 151 and the taillight 152 when the illuminance detected by the illuminance sensor 1 is smaller than a predetermined threshold value. The microcomputer 2 determines that the periphery of the vehicle 150 is bright and outputs the light-OFF command of the headlight 151 and the taillight 152 when the illuminance detected by the illuminance sensor 1 is greater than a predetermined threshold value. In other words, the illuminance sensor 1 and the microcomputer 2 configure an automatic light control device for automatically controlling the light-ON/OFF state of the headlight 151 and the taillight 152.

The communication circuit 3 is a CAN (Controller Area Network) transceiver, for example, and is arranged to digitally communicate with the vehicle control unit 156, and the like. For example, the communication circuit 3 transmits the light-ON command and the light-OFF command (processing signal from the microcomputer 2) to the vehicle control unit 156 in digital signals.

The insolation sensor 4 detects an amount of insolation entering inside the vehicle from outside the vehicle. The air conditioner 155 is arranged to adjust the temperature in the compartment of the vehicle 150. The air conditioner 155 is configured to determine an amount of heat the passenger of the vehicle 150 receives based on the detection result of the insolation sensor 4, and automatically adjust the temperature in the compartment of the vehicle 150.

The vehicle control unit 156 includes a communication circuit 156a and a microcomputer 156b. The communication circuit 156a is a CAN transceiver, for example, and is arranged to digitally communicate with the photo detection device 100, and the like. For example, the communication circuit 156a receives the light-ON command and the light-OFF command transmitted from the photo detection device 100.

The microcomputer 156b is configured by a CPU, a ROM, a RAM, and the like, and controls the operation of the vehicle 150. For example, the microcomputer 156b turns ON the headlight 151 when the light ON command is inputted from the headlight switch 153, and turns OFF the headlight 151 when the light OFF command is inputted from the headlight switch 153. The microcomputer 156b also turns ON the taillight 152 when the light ON command is inputted from the taillight switch 154, and turns OFF the taillight 152 when the light OFF command is inputted from the taillight switch 154.

The microcomputer 156b also turns ON the headlight 151 and the taillight 152 when the communication circuit 156a receives the light ON command transmitted from the photo detection device 100, and turns OFF the headlight 151 and the taillight 152 when the communication circuit 156a receives the light OFF command transmitted from the photo detection device 100.

The structure of the photo detection device 100 according to one or more embodiments of the present invention will now be described with reference to FIG. 2 to FIG. 6.

Figure 2:
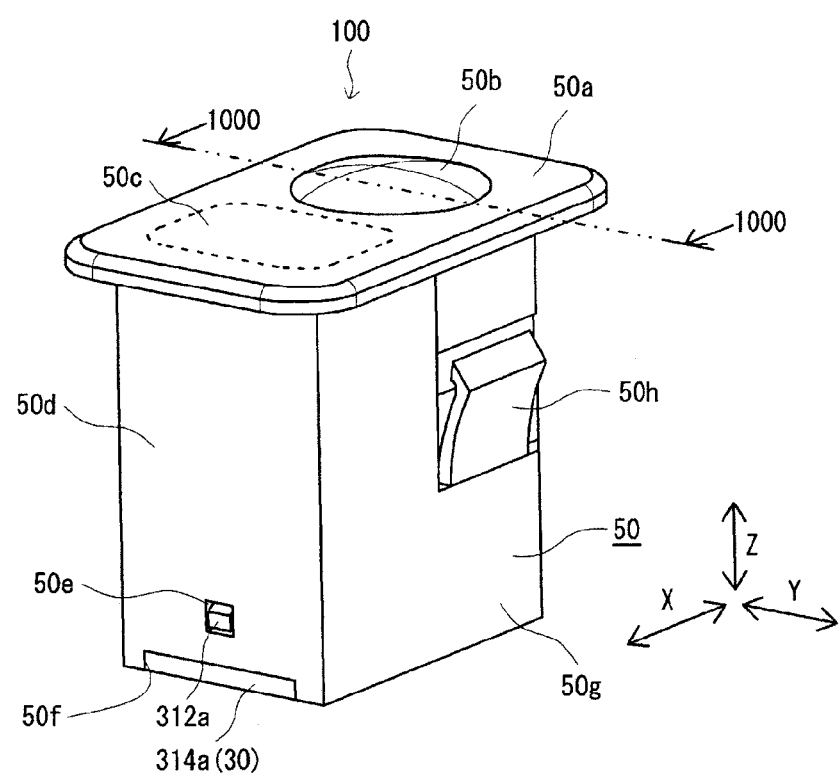
FIG. 2 is a perspective view showing a structure of the photo detection device of FIG. 1.
Figure 3:
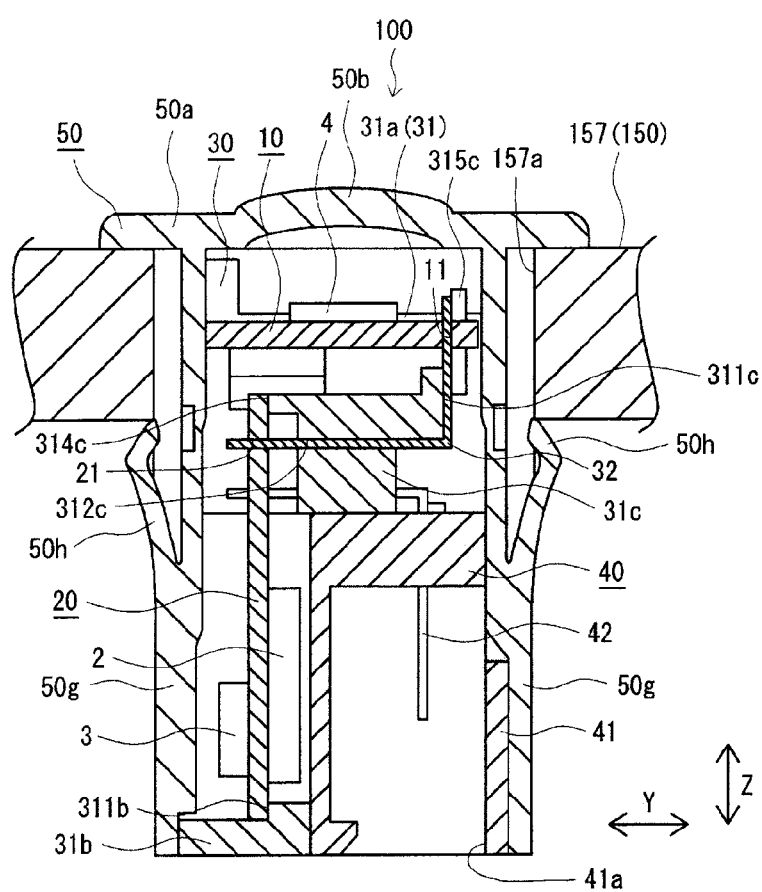
FIG. 3 is a cross-sectional view taken along line 1000-1000 of a state in which the photo detection device of FIG. 2 is attached to a dashboard.
Figure 4:
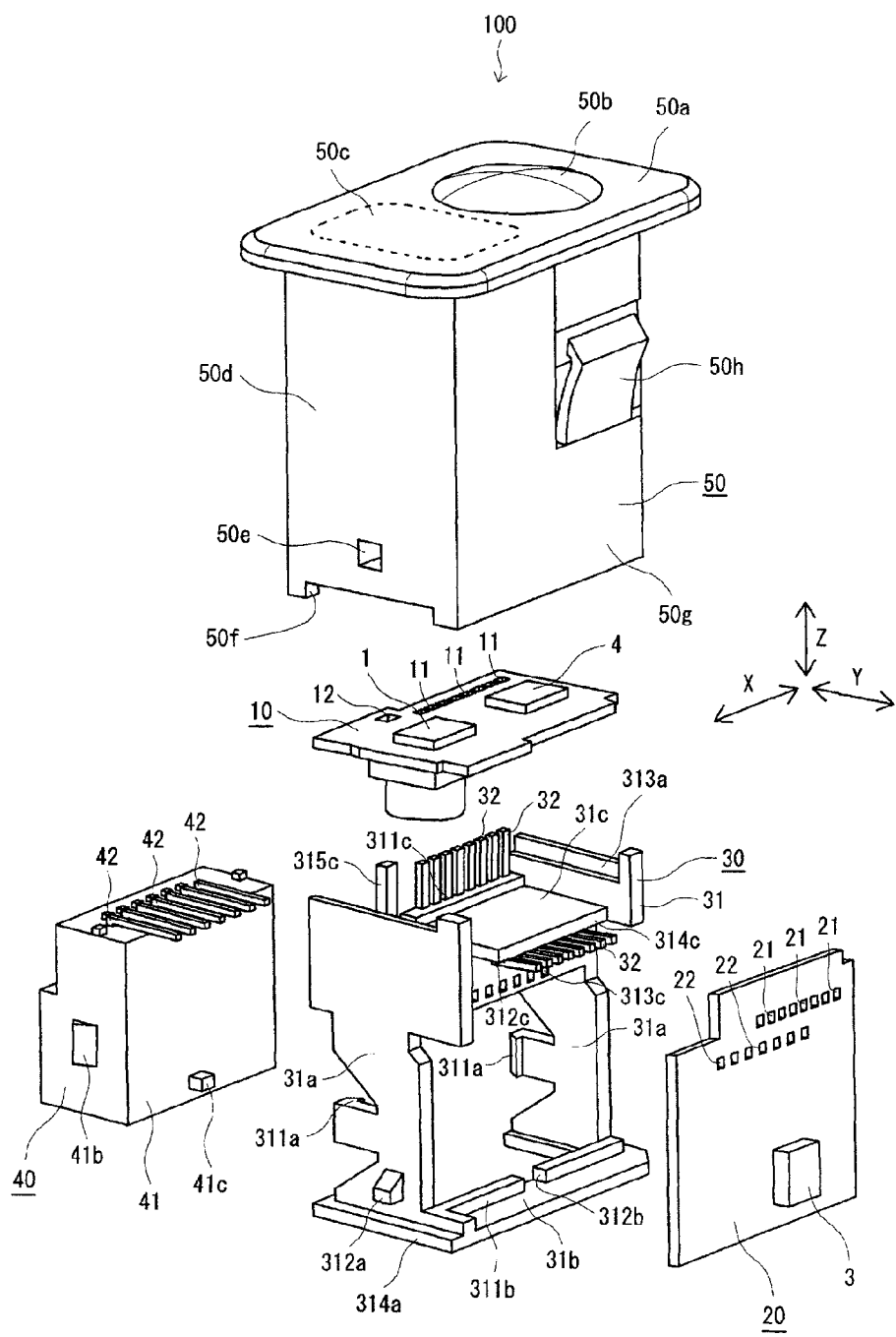
FIG. 4 is an exploded perspective view showing the structure of the photo detection device of FIG. 2.

The photo detection device 100 (see FIG. 2) according to the present embodiment is inserted to an attachment hole 157a formed in the dashboard 157 of the vehicle 150, as shown in FIG. 3. As shown in FIG. 4, the photo detection device 100 includes printed circuit boards 10 and 20, a holding member 30, a connector unit 40, and a housing 50. The printed circuit boards 10 and 20 serve as "first board" and "second board" of one or more embodiments of the present invention.

The illuminance sensor 1 and the insolation sensor 4 are mounted on the printed circuit board 10. The printed circuit board 10 is also formed with a connection hole 11 for electrically connecting with the printed circuit board 20, and a positioning hole 12 for positioning. A plurality of connection holes 11 (eight in the present embodiment) are formed at a predetermined interval in the X direction.

The microcomputer 2 (see FIG. 3) and the communication circuit 3 are mounted on the printed circuit board 20. The printed circuit board 20 is also formed with a connection hole 21 for electrically connecting with the printed circuit board 10, and a connection hole 22 to which a connection terminal 42 of the connector unit 40 is electrically connected. A plurality of connection holes 21 (eight in the present embodiment) are formed at a predetermined interval in the X direction. A plurality of connection holes 22 (seven in the present embodiment) are formed at a predetermined interval in the X direction on the lower side of the plurality of connection holes 21.

Figure 5:
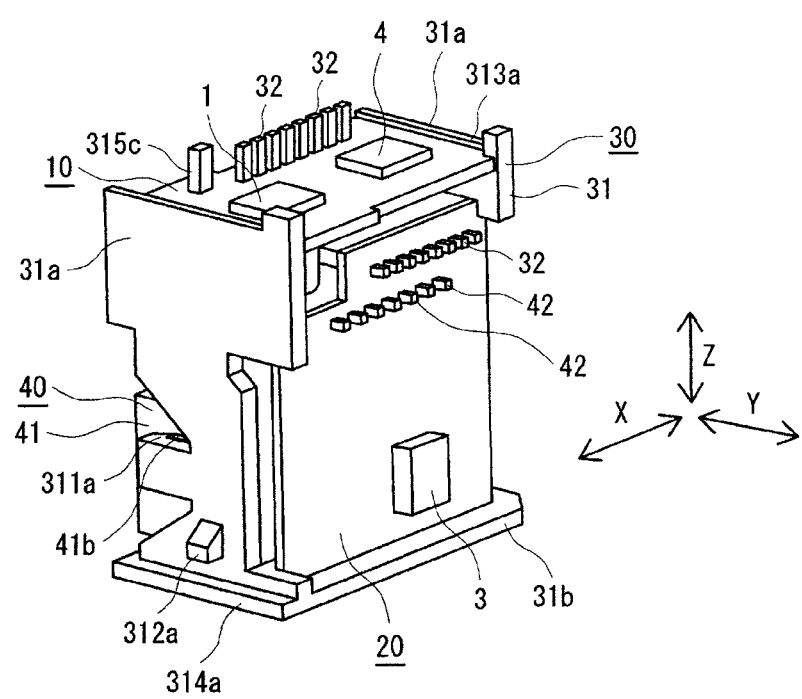
FIG. 5 is a perspective view showing a state in which a housing of the photo detection device of FIG. 2 is removed.
Figure 6:
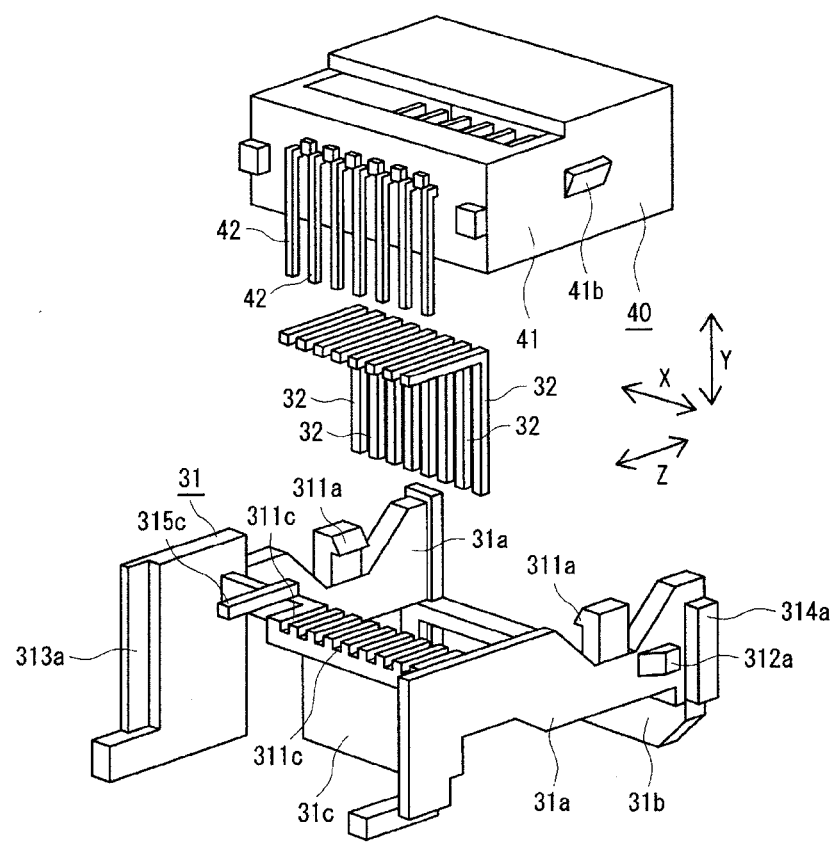
FIG. 6 is an exploded perspective view showing a holding member and a connector unit of the photo detection device of FIG. 2.

As shown in FIG. 5, the holding member 30 holds the printed circuit board 10 so as to be orthogonal to the Z direction, and holds the printed circuit board 20 so as to be orthogonal to the Y direction. A plane in which the printed circuit board 10 is arranged and a plane in which the printed circuit board 20 is arranged are thus orthogonal. The holding member 30 also holds the connector unit 40.

As shown in FIG. 4, the holding member 30 includes a holding member main body 31 formed by resin, and a connection pin 32 for electrically connecting the printed circuit boards 10 and 20. The holding member main body 31 includes a pair of side plate portions 31a and coupling portions 31b and 31c for coupling the pair of side plate portions 31a.

The pair of side plate portions 31a is formed with an engagement part 311a for holding the connector unit 40, and is also formed with an engagement part 312a for attaching the holding member 30 to the housing 50. The engagement part 311a is formed to project out to the inner side in the X direction. The engagement part 312a is formed to project out to the outer side in the X direction.

A step difference 313a for arranging the printed circuit board 10 between the pair of side plate portions 31a is formed at the upper end of the pair of side plate portions 31a. A projection 314a that projects out to the side is formed at the lower end of the pair of side plate portions 31a.

A coupling portion 31b is formed at the lower end of the pair of side plate portions 31a and is formed to project out to one side in the Y direction. The coupling portion 31b includes a contact portion 311b that comes into contact with the printed circuit board 20, and a positioning part 312b for positioning the connector unit 40.

A coupling portion 31c includes a groove 311c, in which a connection pin 32 is arranged, and an insertion hole 312c to which the connection pin 32 is inserted. Pluralities of grooves 311c and insertion holes 312c (eight each in the present embodiment) are formed at a predetermined interval in the X direction. The groove 311c (see FIG. 6) is formed to extend in the Z direction and the insertion hole 312c (see FIG. 4) is formed to extend in the Y direction.

The coupling portion 31c includes an insertion hole 313c, to which the connection terminal 42 of the connector unit 40 is inserted, a contact portion 314c that comes into contact with the printed circuit board 20, and a positioning pin 315c for positioning the printed circuit board 10. A plurality of insertion holes 313c (seven in the present embodiment) are formed at a predetermined interval in the X direction and are formed to extend in the Y direction. The positioning pin 315c is formed to extend in the Z direction, and is inserted to the positioning hole 12 of the printed circuit board 10.

A plurality of connection pins 32 (eight in the present embodiment) are formed at a predetermined interval in the X direction. As shown in FIG. 3, the connection pin 32 is formed to an L shape in side view, and is attached to the holding member main body 31. The connection pin 32 has one end soldered while being inserted to the connection hole 11 of the printed circuit board 10, and the other end soldered while being inserted to the connection hole 21 of the printed circuit board 20.

The connector unit 40 is arranged to communicate with the vehicle control unit 156 (see FIG. 1) and the like, and outputs the detection result of the insolation sensor 4 to the air conditioner 155 (see FIG. 1). The connector unit 40 is arranged on the lower side of the printed circuit board 10 and on the side of the printed circuit board 20.

The connector unit 40 includes a box member 41 formed by resin, and a connection terminal 42 attached to the box member 41. The box member 41 has an opening 41a formed at the lower end, and is configured so that an external connector (not shown) can be attached. As shown in FIG. 4, the box member 41 is formed with an engagement part 41b that engages the engagement part 311a of the holding member 30, and is also formed with a projection 41c arranged on the positioning part 312b of the holding member 30.

A plurality of connection terminals 42 (seven in the present embodiment) are formed at a predetermined interval in the X direction. As shown in FIG. 3, the connection terminal 42 is formed to an L shape in side view and has one end soldered while being inserted to the connection hole 22 (see FIG. 4) of the printed circuit board 20.

The housing 50 is made of resin and is formed in a box shape with the lower end opened. The holding member 30 for holding the printed circuit boards 10 and 20, and the connector unit 40 is attached to the housing 50. The printed circuit boards 10 and 20, the holding member 30, and the connector unit 40 are thus accommodated inside the housing 50.

A lens 50b for the insolation sensor 4 and a lens 50c for the illuminance sensor 1 are formed on the upper surface 50a of the housing 50. The lenses 50b and 50c are lenses that transmit only an infrared light component of incident light. The lens 50b is formed on the upper side of the insolation sensor 4 so as to correspond with the insolation sensor 4. The lens 50c is formed on the upper side of the illuminance sensor 1 so as to correspond with the illuminance sensor 1.

In a surface 50d orthogonal to the X direction of the housing 50, an engagement hole 50e that engages with the engagement part 312a of the holding member 30 is formed in the vicinity of the lower end of the surface 50d and a cutout 50f in which the projection 314a of the holding member 30 is arranged is formed at the lower end of the surface 50d. Further, in a surface 50g orthogonal to the Y direction of the housing 50, a nail portion 50h for attaching the housing 50 to the attachment hole 157a (see FIG. 3) of the dashboard 157 is formed.

The method of assembling the photo detection device 100 according to one or more embodiments of the present invention will now be described with reference to FIG. 2 to FIG. 8.

Figure 7:
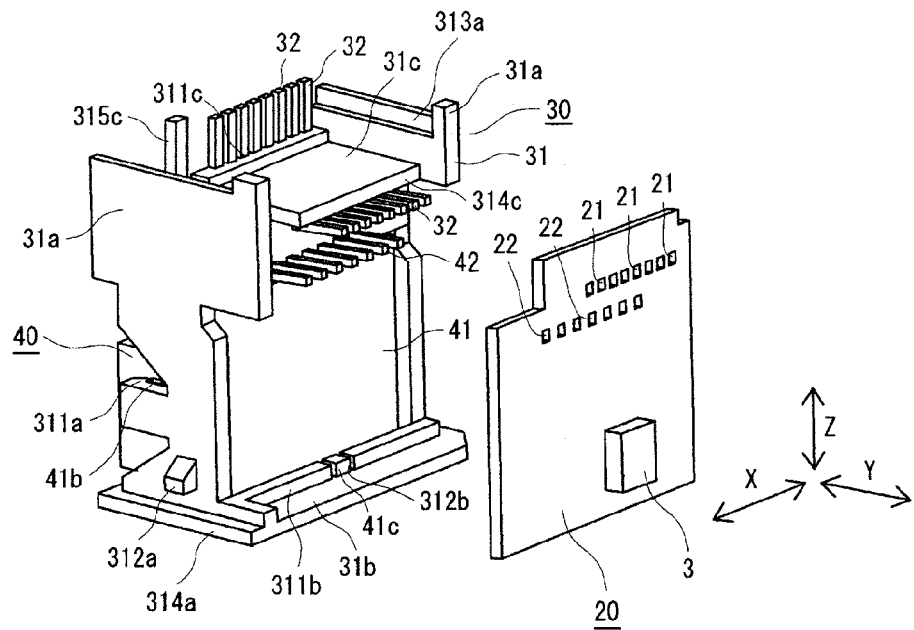
FIG. 7 is a perspective view for describing a method of assembling a photo detection device according to one or more embodiments of the present invention.

The connector unit 40 is first moved in the Y direction from the state shown in FIG. 4 to insert the connection terminal 42 of the connector unit 40 to the insertion hole 313c of the holding member 30. Thereafter, the connector unit 40 is further moved in the Y direction so that the projection 41c of the connector unit 40 is arranged in the positioning part 312b of the holding member 30 and the engagement part 41b of the connector unit 40 is engaged with the engagement part 311a of the holding member 30, as shown in FIG. 7. The connector unit 40 is thereby attached to the holding member 30.

The printed circuit board 20 is then moved in the Y direction from the state shown in FIG. 7 so that the connection pin 32 of the holding member 30 is inserted to the connection hole 21 of the printed circuit board 20 and the connection terminal 42 of the connector unit 40 is inserted to the connection hole 22 of the printed circuit board 20. The printed circuit board 20 is moved in the Y direction until the printed circuit board 20 comes into contact with the contact portions 311b and 314c of the holding member 30. Thereafter, the connection pin 32 is soldered to the printed circuit board 20 and the connection terminal 42 is soldered to the printed circuit board 20 with the printed circuit board 20 in contact with the contact portions 311b and 314c of the holding member 30. The printed circuit board 20 is thereby attached to the holding member 30 so as to be orthogonal to the Y direction, as shown in FIG. 8.

Figure 8:
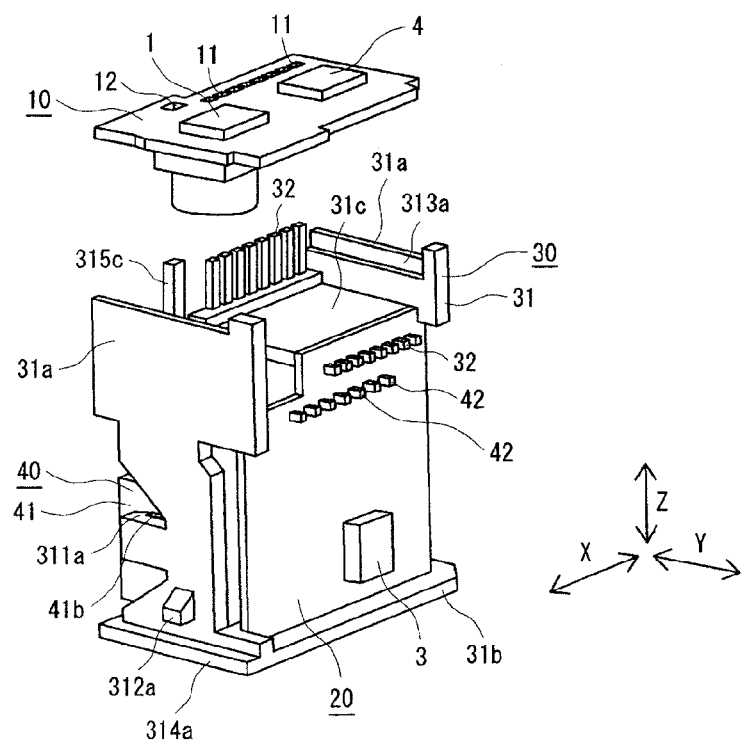
FIG. 8 is a perspective view for describing a method of assembling a photo detection device according to one or more embodiments of the present invention.

The printed circuit board 10 is then moved in the Z direction from the state shown in FIG. 8 so that the positioning pin 315c of the holding member 30 is inserted to the positioning hole 12 of the printed circuit board 10 and the connection pin 32 of the holding member 30 is inserted to the connection hole 11 of the printed circuit board 10. The printed circuit board 10 is moved in the Z direction until the printed circuit board 10 is arranged on the step difference 313a of the holding member 30. Subsequently, the connection pin 32 is soldered to the printed circuit board 10 with the printed circuit board 10 arranged on the step difference 313a of the holding member 30. The printed circuit board 10 is thereby attached to the holding member 30 so as to be orthogonal to the Z direction, as shown in FIG. 5.

The holding member 30 holding the printed circuit boards 10 and 20, and the connector unit 40 is then inserted from the opening formed at the lower end of the housing 50 (see FIG. 4). When the engagement part 312a of the holding member 30 engages with the engagement hole 50e of the housing 50, the holding member 30 holding the printed circuit boards 10 and 20, and the connector unit 40 is attached to the housing 50, as shown in FIG. 2. In this case, the projection 314a of the holding member 30 is arranged in the cutout 50f of the housing 50.

In one or more embodiments, as described above, the printed circuit board 10 mounted with the illuminance sensor 1 and the printed circuit board 20 mounted with the microcomputer 2 are separately arranged, where the printed circuit board 20 is arranged in a plane different from a plane in which the printed circuit board 10 is arranged. With such a configuration, the printed circuit boards 10 and 20 can be stereoscopically arranged so that the photo detection device 100 can be miniaturized as compared to the case of mounting the illuminance sensor and the microcomputer on one printed circuit board. Furthermore, the holding member 30 for holding the printed circuit boards 10 and 20 is arranged, so that the holding member 30 can be accommodated in the housing 50 after attaching the printed circuit boards 10 and 20 to the holding member 30. The accommodation to the housing 50 is thereby facilitated. As a result, assembly can be facilitated while realizing miniaturization.

In one or more embodiments, the photo detection device 100 is effectively miniaturized by having the plane in which the printed circuit board 10 is arranged and the plane in which the printed circuit board 20 is arranged orthogonal to each other.

In one or more embodiments, the connector unit 40 is arranged on the lower side of the printed circuit board 10 and at the side of the printed circuit board 20, so that the connector unit 40 can be arranged while realizing miniaturization of the photo detection device 100 by effectively using a rectangular parallelepiped space formed by the printed circuit boards 10 and 20.

In one or more embodiments, the communication circuit 3 for transmitting the light ON command and the light OFF command to the vehicle control unit 156 with the digital signal is arranged, so that the influence of noise can be suppressed compared to the case of outputting the detection result of the illuminance sensor 1 with the analog signal. The reliability of the automatic light control thus can be suppressed from lowering.

In one or more embodiments, the insolation sensor 4 is also mounted on the printed circuit board 10 on which the illuminance sensor 1 is mounted so that the temperature in the compartment of the vehicle 150 can be automatically adjusted without separately arranging the photo detection device for controlling the air conditioner 155.

In one or more embodiments, the engagement part 312a is formed in the holding member 30, and the engagement hole 50e is formed in the housing 50. Thus, the holding member 30 can be easily attached to the housing 50 by engaging the engagement part 312a of the holding member 30 to the engagement hole 50e of the housing 50 without using an adhesive or the like.

The present invention may adopt various embodiments other than the above. For example, in one or more of the above embodiments, an example is shown in which the plane in which the printed circuit board 10 is arranged and the plane in which the printed circuit board 20 is arranged are orthogonal, but the present invention is not limited thereto, and the printed circuit board 20 merely needs to be arranged in a plane different from the plane in which the printed circuit board 10 is arranged. For example, the printed circuit board 20 may be arranged parallel to the printed circuit board 10 at the lower side of the board 10. In this case, each projection face of the board 10, 20 seen from the Z direction may completely overlap or may be partially shifted. The printed circuit board 20 may be arranged to incline with respect to the printed circuit board 10.

In one or more of the above embodiments, an example is shown in which the illuminance sensor 1 and the insolation sensor 4 are mounted on the printed circuit board 10, but the present invention is not limited thereto, and only the illuminance sensor 1 may be mounted on the printed circuit board 10. Furthermore, only the insolation sensor (first photo detection element) 4 may be mounted on the printed circuit board 10. In this case, a microcomputer (first signal processing unit) for automatic air conditioner control is mounted on the printed circuit board 20 in place of the microcomputer 2 configuring the automatic light control device.

Figure 9:
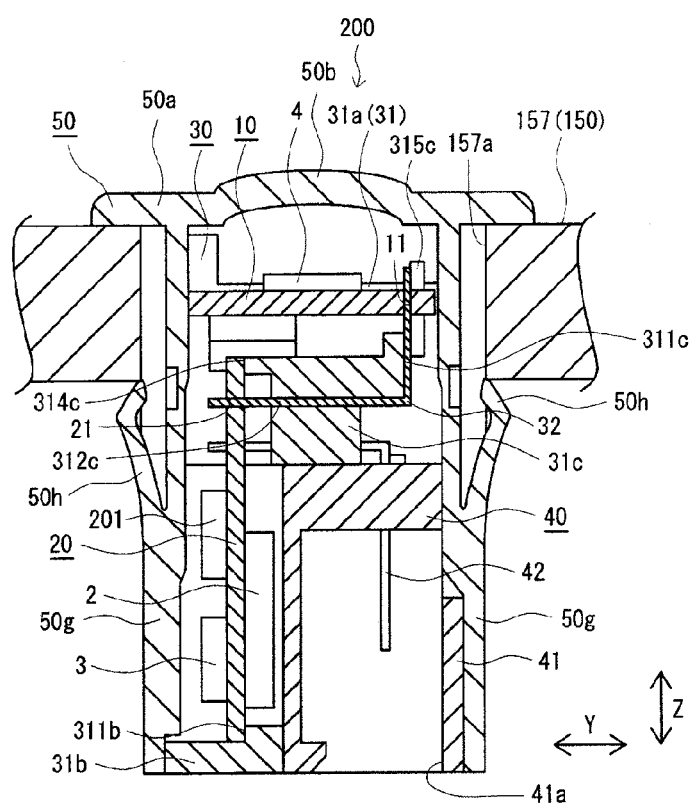
FIG. 9 is a cross-sectional view showing a photo detection device according to a first variant of one or more embodiments of the present invention.

In one or more of the above embodiments, the microcomputer 201 for automatic air conditioner control may be mounted on the printed circuit board 20 in addition to the microcomputer 2 as in the photo detection device 200 according to a first variant shown in FIG. 9. The microcomputer 201 serves as a "second signal processing unit" of one or more embodiments of the present invention. According to this configuration, because the control signal for automatic air conditioner control can be outputted with the digital signal, the influence of noise can be suppressed from being received compared to the case of outputting the detection result of the insolation sensor 4 with the analog signal.

Figure 10:
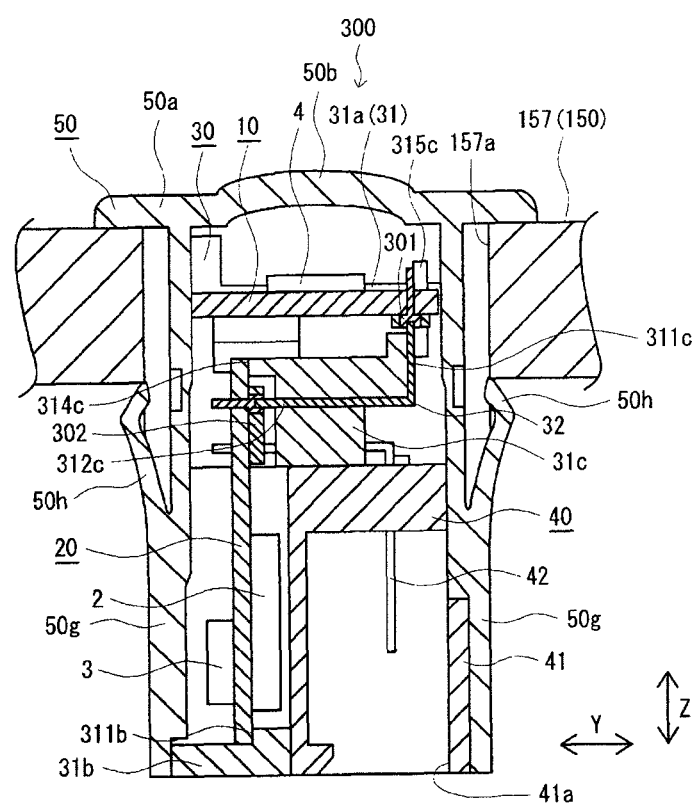
FIG. 10 is a cross-sectional view showing a photo detection device according to a second variant of one or more embodiments of the present invention.
Figure 11:
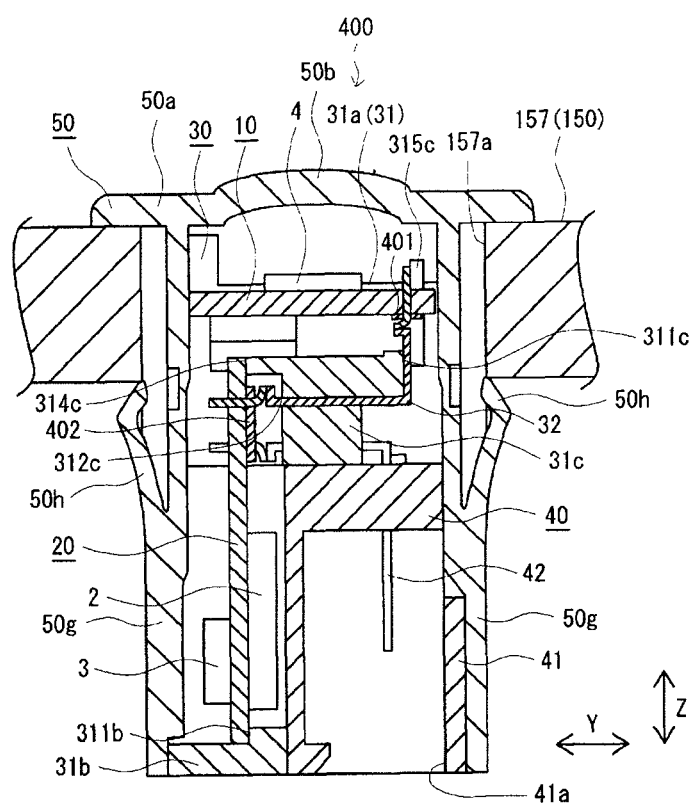
FIG. 11 is a cross-sectional view showing a photo detection device according to a third variant of one or more embodiments of the present invention.

In one or more of the above embodiments, an example is shown in which the connection pin 32 is soldered to the printed circuit board 10 and the connection pin 32 and the connection terminal 42 are soldered to the printed circuit board 20. However, the present invention is not limited thereto, and the connector 301 to which the connection pin 32 is inserted may be mounted on the printed circuit board 10 and the connector 302 to which the connection pin 32 and the connection terminal 42 are inserted may be mounted on the printed circuit board 20 as in the photo detection device 300 according to a second variant shown in FIG. 10. A push contact type connector 401 may be mounted on the printed circuit board 10, and a push contact type connector 402 may be mounted on the printed circuit board 20 as in a photo detection device 400 according to a third variant shown in FIG. 11.

Figure 12:
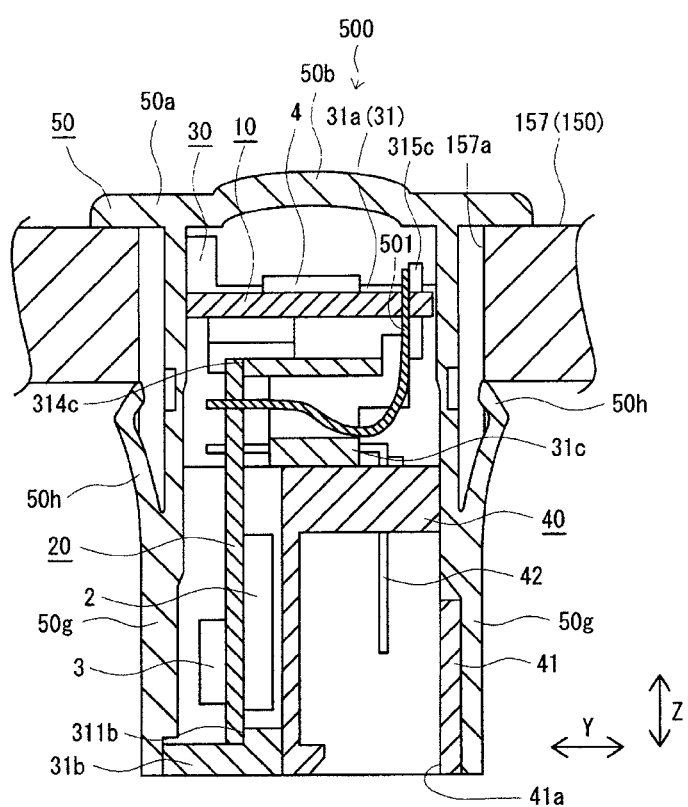
FIG. 12 is a cross-sectional view showing a photo detection device according to a fourth variant of one or more embodiments of the present invention.

In one or more of the above embodiments, an example is shown in which the printed circuit boards 10 and 20 are connected by the connection pin 32, but the present invention is not limited thereto, and the printed circuit boards 10 and 20 may be connected by a flexible printed circuit board 501 as in a photo detection device 500 according to a fourth variant shown in FIG. 12.

Figure 13:
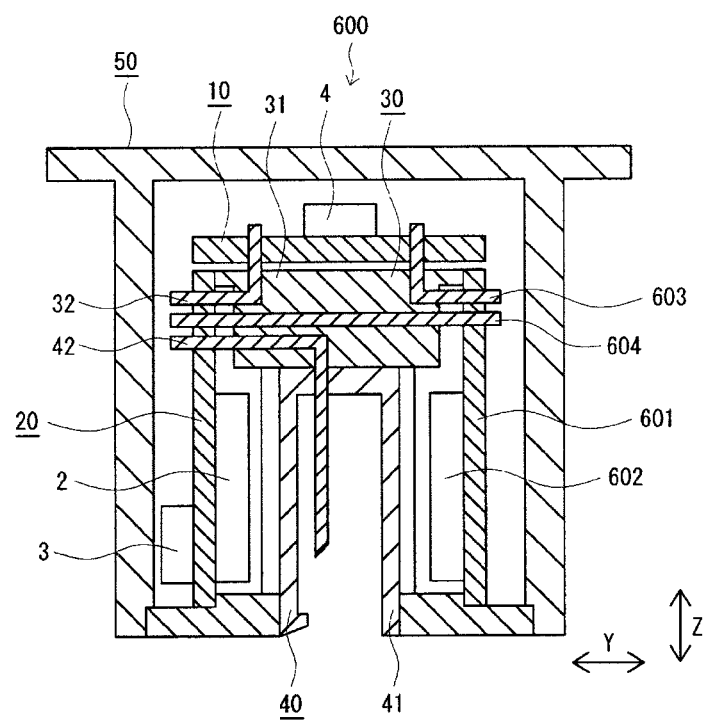
FIG. 13 is a cross-sectional view showing a photo detection device according to a fifth variant of one or more embodiments of the present invention.

In one or more of the above embodiments, a printed circuit board 601 arranged to face the printed circuit board 20 with the connector unit 40 interposed therebetween, a microcomputer 602 for automatic air conditioner control mounted on the printed circuit board 601, a connection pin 603 for electrically connecting the printed circuit board 601 and the printed circuit board 10, and a connection pin 604 for electrically connecting the printed circuit board 601 and the printed circuit board 20 may be further arranged as in a photo detection device 600 according to a fifth variant shown in FIG. 13. The printed circuit board 601 serves as a "third board" of one or more embodiments of the present invention, and the microcomputer 602 serves as a "second signal processing unit" of one or more embodiments of the present invention.

In one or more of the above embodiments, an example is shown in which the lens 50*b* for the insolation sensor 4 and the lens 50*c* for the illuminance sensor 1 are formed on the upper surface 50*a* of the housing 50, but the present invention is not limited thereto, and the lens 50*b* for the insolation sensor 4 and the lens 50*c* for the illuminance sensor 1 may be removably attached to the upper surface 50*a* of the housing 50.

In one or more of the above embodiments, an example is shown in which the headlight switch 153 outputs the light ON command or the light OFF command of the headlight 151 to the vehicle control unit 156, but the present invention is not limited thereto, and the headlight switch 153 may directly output the light ON command or the light OFF command to the headlight 151. The same also applies for the taillight switch 154.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A photo detection device disposed in a vehicle, the photo detection device comprising:
    a first photo detection element that detects light;
    a first signal processing unit that performs a predetermined process based on a detection result of the first photo detection element;
    a first board on which the first photo detection element is mounted;
    a second board on which the first signal processing unit is mounted;
    a connector unit which is formed by a member different from the first board and the second board and to which an external connector is attachable;
    a holding member that holds the first board, the second board, and the connector unit; and
    a housing that accommodates the holding member,
    wherein
        the holding member holds the first board at an upper side of the connector unit and holds the second board at a side of the connector unit such that the second board is arranged in a second plane different from a first plane in which the first board is arranged, and
        the holding member is formed with an engagement part that engages with the housing.

2. The photo detection device according to claim 1, wherein the holding member holds the first board and the second board such that the first plane in which the first board is arranged and the second plane in which the second board is arranged are orthogonal.

3. The photo detection device according to claim 1, further comprising:
    a communication circuit, mounted on the second board, for outputting a processing signal from the first signal processing unit with a digital signal.

4. The photo detection device according to claim 1, further comprising:
    a second photo detection element for detecting light, wherein
    the second photo detection element is mounted on the first board.

5. The photo detection device according to claim 4, further comprising:
    a second signal processing unit for performing a predetermined process based on a detection result of the second photo detection element.

6. The photo detection device according to claim 5, wherein the second signal processing unit is mounted on the second board.

7. The photo detection device according to claim 5, further comprising:
    a third board on which the second signal processing unit is mounted, wherein
    the holding member holds the third board so that the third board is arranged in a third plane different from a first plane in which the first board is arranged.

8. The photo detection device according to claim 1, further comprising:
    a connector unit held by the holding member, wherein
    the holding member holds the first board at an upper side of the connector unit and holds the second board at a side of the connector unit.

9. The photo detection device according to claim 8, further comprising:
    a communication circuit, mounted on the second board, for outputting a processing signal from the first signal processing unit with a digital signal.

10. The photo detection device according to claim 9, further comprising:
    a second photo detection element for detecting light, wherein
    the second photo detection element is mounted on the first board.

11. The photo detection device according to claim 10, further comprising:
    a second signal processing unit for performing a predetermined process based on a detection result of the second photo detection element.

12. The photo detection device according to claim 11, wherein the second signal processing unit is mounted on the second board.

13. The photo detection device according to claim 11, further comprising:
   a third board on which the second signal processing unit is mounted, wherein
   the holding member holds the third board so that the third board is arranged in a third plane different from a first plane in which the first board is arranged.

* * * * *